US006954758B1

(12) United States Patent
O'Flaherty

(10) Patent No.: US 6,954,758 B1
(45) Date of Patent: Oct. 11, 2005

(54) BUILDING PREDICTIVE MODELS WITHIN INTERACTIVE BUSINESS ANALYSIS PROCESSES

(75) Inventor: Kenneth W. O'Flaherty, La Jolla, CA (US)

(73) Assignee: NCR Corporation, Dayton, OH (US)

( * ) Notice: Subject to any disclaimer, the term of this patent is extended or adjusted under 35 U.S.C. 154(b) by 987 days.

(21) Appl. No.: 09/608,496

(22) Filed: Jun. 30, 2000

(51) Int. Cl.[7] ................................................ G06F 17/30

(52) U.S. Cl. ...................... 707/102; 707/10; 707/104.1; 707/3

(58) Field of Search ................................ 707/1–3, 5–6, 707/10, 100–104.1; 715/511; 709/224

(56) References Cited

U.S. PATENT DOCUMENTS

| | | | | |
|---|---|---|---|---|
| 5,701,400 A | | 12/1997 | Amado | 706/45 |
| 5,787,425 A | | 7/1998 | Bigus | 395/76 |
| 5,970,482 A | * | 10/1999 | Pham et al. | 706/16 |
| 6,128,624 A | * | 10/2000 | Papierniak et al. | 707/104.1 |
| 6,182,061 B1 | * | 1/2001 | Matsuzawa et al. | 707/2 |
| 6,408,292 B1 | * | 6/2002 | Bakalash et al. | 707/2 |

OTHER PUBLICATIONS

Chen et al., "A distributed OLAP infrastructure for e–commerce" 1999, pp. 209–220.*

Scarfe et al., "Data mining applications in BT", Feb. 5, 1995, pp. 1–4.*

Reese Hedberg, "Parallelism speeds data mining", 1995, pp. 3–6.*

S. Spaccapietra, "Feeding data warehouse", 1999, pp. 16–18.*

Goil et al, "A parallel scalabe infrastructure for OLAP and data mining", Aug. 1999, pp. 178–186.*

* cited by examiner

*Primary Examiner*—Mohammad Ali
(74) *Attorney, Agent, or Firm*—Gates & Cooper LLP

(57) ABSTRACT

A Customer Relationship Management (CRM) system that dynamically builds predictive models. The system is used by business users who are unfamiliar with the art of data mining. A model-building mechanism in a data mining subsystem is presented with a training segment consisting of records with appropriate input attributes and an output attribute to be predicted; the model-building mechanism builds a model in the form of a business measure that can subsequently be applied to make predictions against other like segments.

45 Claims, 5 Drawing Sheets

BUILDING PREDICTIVE MODELS WITHIN INTERACTIVE BUSINESS ANALYSIS PROCESSES

CROSS REFERENCE TO RELATED APPLICATIONS

This application is related to the following co-pending and commonly-assigned patent application, which is incorporated by reference herein:

Application Ser. No. 09,608,595, entitled "INCORPORATING PREDICTIVE MODEL WITHIN INTERACTIVE BUSINESS ANALYSIS PROCESS," filed on same date herewith, by Kenneth W. O'Flaherty.

BACKGROUND OF THE INVENTION

1. Field of the Invention

This invention relates in general to database management systems performed by computers, and in particular, to the building of predictive models for a Customer Relationship Management (CRM) system that uses a Relational Database Management System (RDBMS).

2. Description of Related Art

In a data warehouse environment, the function of interactive business analysis is supported by a variety of applications and tools, including RDBMS (Relational DataBase Management System) and OLAP (On-Line Analytic Processing) tools. Typically, such business analysis tools use metadata to represent business concepts, and to provide a mapping from the business concepts to data stored in the data warehouse. A business analyst can then use familiar business terms to request an analytic function, and the tool will convert the business terms to the appropriate Table/Column names, and generate and then execute the appropriate SQL to perform the function. Thus, the analyst can request a report on "Sales" for "Eastern Region," where "Sales" is a "Measure" and "Eastern Region" is a "Segment." In this example, Segments and Measures are types of metadata, wherein Measures are values or expressions that are useful in reviewing, analyzing or reporting on data elements represented by segments.

The Measures supported by current analytic tools are either simple aggregations (e.g., "Revenues"), or more complex derivations based on formulas (e.g., "Margin"="Revenues—Costs," and "Percent Margin"="Margin/Revenues*100"). In each case, the definitions for the Measures is provided by a human, e.g., by a business analyst during a set-up process that occurs following installation but prior to execution of the tool. Usually, the definitions for the Measures comprise a manual metadata definition process.

A Measure might be predictive, e.g., rather than measure past performance or behavior, it might predict future performance or behavior, typically in the form of a propensity score. For example, it might predict the propensity of a Customer Segment to purchase a product or to terminate service. The formula for a predictive Measure might be provided by a human, based on prior experience or intuition.

A more rigorous approach would be to use a predictive modeling system, the output of which is typically a predictive model which may or may not be in some executable form. Typically, in order to use such a model as a predictive Measure in a business analysis tool, it would be necessary for a human to translate the predictive model formula into an appropriate form (e.g., as SQL statements) that can be processed by the business analysis tool.

Unfortunately, predictive modeling systems are technically complex, and require a high level of statistical and data mining skills to create successful models, including knowledge about the algorithms involved and how they operate. They also typically require expert knowledge of the data involved in the prediction, and programming skills in order to manipulate the data into a form that the predictive modeling system requires.

There is a need then to make data mining algorithms more accessible and more available to business people. There is a strong requirement for marketing campaign planners with modest technical skills (e.g., business analysts) to be able to build predictive models directly in support of their business tasks. Furthermore, once predictive models have been produced, they typically become less effective over time ("model decay"), since the behavior they model becomes outdated as time passes and conditions change. There is thus a further need for business analysts to be able to modify, update, or "tune" existing predictive models.

SUMMARY OF THE INVENTION

A Customer Relationship Management (CRM) system that dynamically builds predictive models. The system is used by business users who are unfamiliar with the art of data mining. A model-building mechanism in a data mining subsystem is presented with a training segment comprised of records with appropriate input attributes and an output attribute to be predicted; and the model-building mechanism builds a model in the form of a business measure that can subsequently be applied to make predictions against other like segments.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
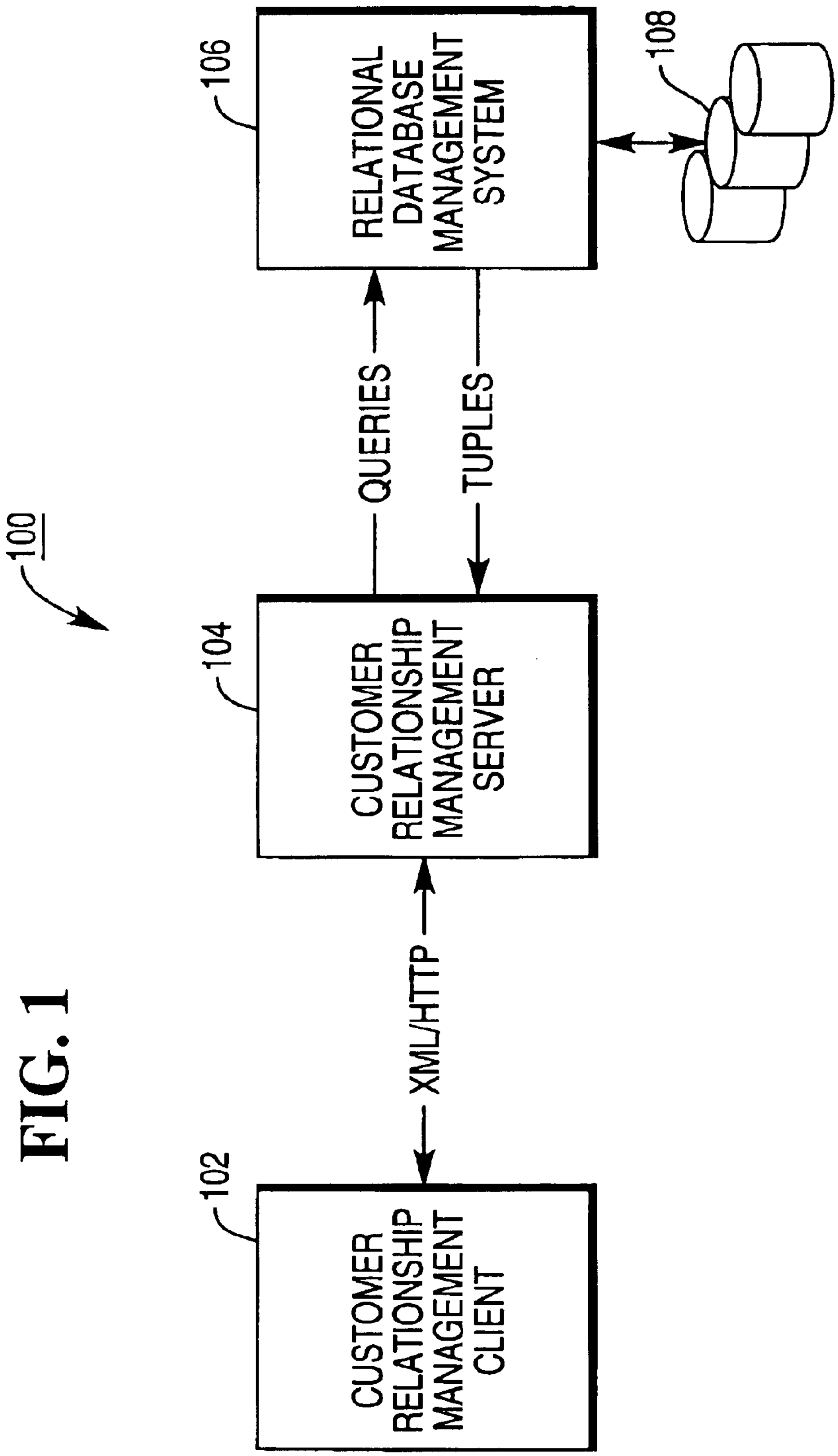
FIG. 1 illustrates an exemplary hardware and software environment that could be used with the present invention.

In the following description of the preferred embodiment, reference is made to the accompanying drawings which form a part hereof, and in which is shown byway of illustration a specific embodiment in which the invention may be practiced. It is to be understood that other embodiments may be utilized and structural changes may be made without departing from the scope of the present invention.

Definitions

In the context of this application, the following terminology is used:

Segment: A Segment is a grouping of data elements organized about one or more attributes. Segments may be subdivided into Sub-Segments based on Attributes or Filters, which may be categorical (such as "Type of Residence," "Marital Status," or "Brand"), numeric (such as "Age>65," or "Price>$25"), etc. Sub-Segments themselves can be further subdivided into Sub-Segments.

Filter: A Filter defines one or more attribute constraints applied to a Segment or Sub-Segment, usually to create a Sub-Segment. For example, a Segment "California Customers" may be constrained to "Female California Customers" by applying a Filter for gender.

Profile: A Profile is a collection of attributes relating to a Segment. For example, a Demographic Profile might include those attributes of a Customer Segment that contain demographic information, such as gender, zip code, marital status, household group, home ownership, vehicle ownership, etc. Pre-defined Profiles may be available, as is the ability to create ad hoc profiles from the available set of attributes for a Segment.

Measure: A Measure is a formula applied against a Segment or Sub-Segment. A Measure may involve simply aggregating values retrieved from a database, computing a formula, or executing a previously-built predictive model. Function: A Function is a control for splitting, merging, and branching. Application Template: An Application Template is a sequence of Segments, Filters, Measures and Functions linked together in a workflow, wherein arrows indicate the flow of data.

Overview

The present invention provides a mechanism for dynamically building predictive models in an interactive business analysis environment, where an analyst uses business terms to accomplish his or her tasks, and where the system translates the functions requested by the analyst into SQL statements and then executes these SQL statements against a relational database. The predictive model is generated in the form of a Measure, which characterizes an input Segment based on the Attributes presented with the Segment, and which can then be used or deployed against other Segments having similar Attributes. The present invention also exploits Application Templates to reuse expert knowledge gained from prior model-building experiences, making such knowledge available to lower-skilled business analysts such that they can successfully build predictive models. The present invention also exploits visual programming techniques for constructing and representing the steps in the Application Templates.

Environment

FIG. 1 illustrates an exemplary environment that could be used with the preferred embodiment of the present invention. In the exemplary environment, a computer-implemented Customer Relationship Management (CR) system 100 comprises a three-tier client-server architecture, wherein the first tier comprises a CRM Client 102 that provides a graphical user interface (GUI) or other application, the second tier comprises a CRM Server 104 that provides a framework for executing CRM applications, and the third tier comprises a Relational DataBase Management System (RDBMS) server 106 that manages a relational database 108 (which includes both data and metadata).

In the preferred embodiment, the CRM Client 102, CRM Server 104, RDBMS 106, and relational database 108 each comprise logic and/or data tangibly embodied in and/or accessible from a device, media, carrier, or signal, such as RAM, ROM, one or more of the data storage devices, and/or one or more remote systems or devices communicating with the CRM system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Customer Relationship Management Server

Figure 2:
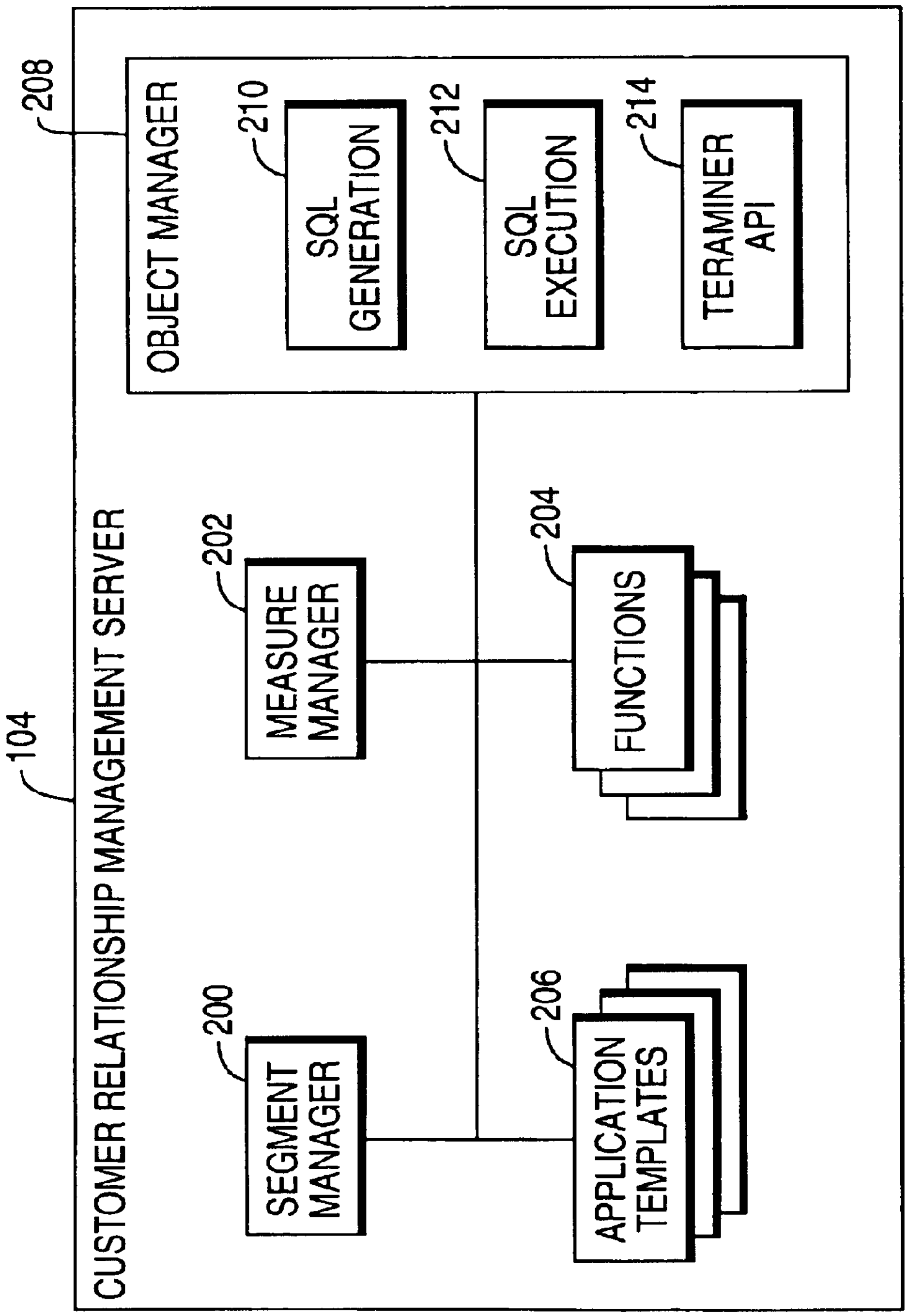
FIG. 2 illustrates an exemplary architecture for the Customer Relationship Management (CRM) Server according to the preferred embodiment of the present invention.

FIG. 2 illustrates an exemplary architecture for the CRM Server 104 according to the preferred embodiment of the present invention. The CRM Server 104 provides a common, adaptable, and extensible platform for the development of CRM applications. It uses an object modeling concept to transform data stored in the relational database 108 into an object model to be used within the CRM Server 104 and CRM Client 102. This allows the CRM Server 104 and CRM Client 102 to focus on the object model and not be concerned with the SQL statements required to access the relational database 108.

In the exemplary architecture, the CRM Server 104 provides a framework for executing CRM applications, and includes a Segment Manager 200, Measure Manager 202, Functions 204, and Application Templates 206, as well as other components. The CRM Server 104 also includes an Object Manager 208 that interfaces to the RDBMS 106, wherein the Object Manager 208 includes functions related to SQL Generation 210, SQL Execution 212, and an application programming interface (API) 214 to the TeraMiner™ product provided by NCR Corporation, the assignee of the present invention.

Metadata

The functions performed by the CRM Server 104 and its components are metadata-driven, wherein the metadata describes one or more "Business Models" and one or more "Business Rules." Metadata defines the mapping between objects instantiated in the CRM Server 104 and the data stored in the relational database 108. In this regard, the metadata supports the mapping of Segments, Attributes, Filters, and Measures to the relational database 108.

Segment Manager

The Segment Manager 200 provides a common segmentation engine for use by the other elements of the CRM Server 104. The Segment Manager 200 supports user requests, such as defining Segments, applying Measures and Filters to Segments, profiling Segments, saving Segments, and displaying Segments, as well as merging Segments, removing duplicate entries from Segments, deleting Segments, etc. Users can choose from a set of pre-defined Segments or create ad hoc Segments.

Measure Manager

The Measure Manager 202 provides a common measurement engine for use by the other elements of the CRM Server 104. A Measure is a value or expression applied to a Segment. A Measure may be a simple base measurement (e.g., mapped directly to a field of a table in the relational database 108 or calculated on one or more such fields), or a compound derivative measurement (a calculation involving one or more base measurements). Users can choose from a set of pre-defined Measures or create ad hoc Measures.

Functions

A Function 204 is a module that provides a control service in an Application Template 206. A Function 204 may be a standardized programming element that allows the user to control the sequence of steps, or a customized programming element.

Application Templates

An Application Template 206 is a sequence of Segments, Filters, Measures and Functions linked together in a workflow. The sequence that comprise a workflow in the Application Templates 206 are represented as icons that are linked together, wherein the direction of the connecting arrows determine the sequence of execution and the flow of data.

Users can choose from a set of pre-defined Application Templates 206 or create ad hoc Application Templates 206, as desired. In either case, the user can create and manipulate the Application Template 206. Further, users can add, modify and delete the steps within the Application Template 206.

Object Manager

The Object Manager 208 instantiates data from the relational database 108 via the RDBMS 106, and wraps that data in objects for use by the Segment Manager 200, Measure Manager 202, Functions 204, Application Templates 206, and other elements of the CRM Server 104. The Object Manager 208 interprets the metadata, generates the necessary SQL statements in module 210, and then executes the generated SQL statements in module 212. Object classes that represent business models can be mapped to tables in the relational database 108, thereby providing an object-oriented (OO) representation of the relational database 108. This provides a certain degree of independence from the schema of the relational database 108.

TeraMiner™

The Object Manager 208 also provides a module 214 that accesses an application programming interface (API) to the TeraMiner™ product provided by NCR Corporation, the assignee of the present invention. The TeraMiner™ product is further described in the co-pending and commonly-assigned application Ser. No. 09/410,530, filed on Oct. 1, 1999, by Todd M. Brye, entitled "SQL-Based Analytic Algorithm for Rule Induction," attorney's docket number 8221, which application is incorporated by reference herein.

TeraMiner™ provides functionality that allows the RDBMS 106 to support data mining operations against the relational database 108. In TeraMiner™, advanced analytic processing capabilities for data mining applications are placed where they belong, i.e., close to the data. Moreover, the results of these analytic processing capabilities can be made to persist within the database 108 or can be exported from the database 108. These analytic processing capabilities and their results are exposed externally to the RDBMS 106 by the application programmable interface (API).

CRM Client

Figure 3:
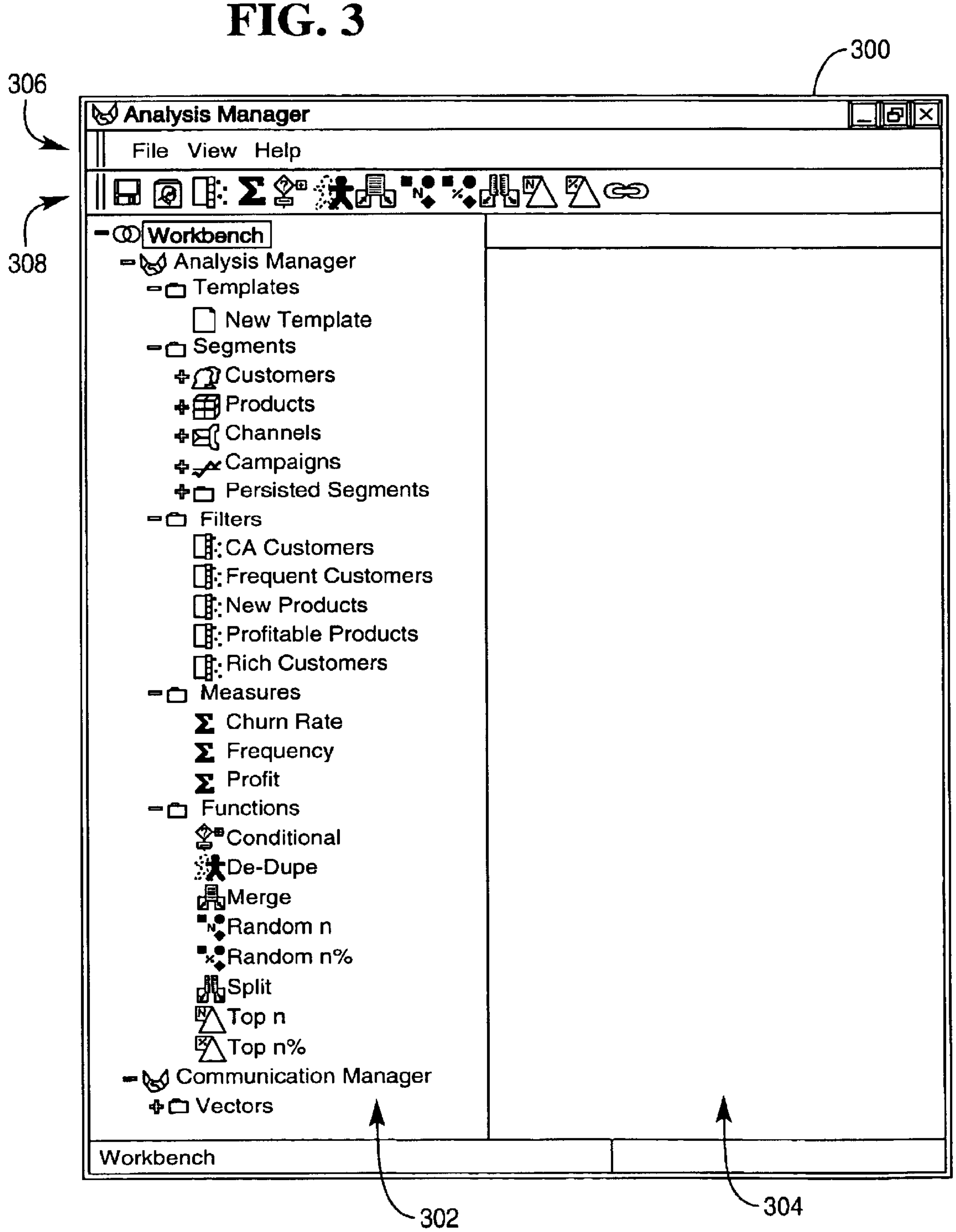
FIG. 3 illustrates a graphical user interface (GUI) of the Customer Relationship Management (CRM) Client according to the preferred embodiment of the present invention.

FIG. 3 illustrates a graphical user interface (GUI) 300 of the CRM Client 102 according to the preferred embodiment of the present invention. The CRM Client 102 is a web browser application that provides a "workbench" that uses a visual programming metaphor to assist the user in creating, modifying, deleting, and executing Application Templates 206.

The GUI of the CRM Client 102 is divided into two panes 302 and 304, with a menu bar 306 and tool bar 308 above the panes 302 and 304.

With regard to the menu bar 306, from left to right, the menus comprise "File," "View," and "Help" menus. These menus and their associated functions are similar to those found in any application.

With regard to the tool bar 308, from left to right, the icons represent: the functions "save current template," "segment," "filter," "measure," "conditional," "de-duplicating," "merge," "random N," "random %," "split," "top N," "top %," and "link". These functions are described in more detail below:

- The "save current template" function saves the Application Template 206 displayed in pane 304 to a specified storage location, either on the CRM Client 102 or CRM Server 104.
- The "segment" function allows the user to perform a number of different tasks related to segments, including: Get a Segment, Persist a Segment, etc.
- The "filter" function allows the user to perform a number of different tasks related to Filters, including: Constrain a Segment (reduce its size based on Attribute selection criteria, e.g., "Disposable Income>$40000"), Profile a Segment (retrieve a pre-defined set of its Attributes), etc.
- The "measure" function allows the user to perform a number of different tasks related to Measures, including: Apply Measures to Segment (e.g., calculate "Profitability" for "California Customers"), Define a Measure (which includes a "Define a Derived Measure"), etc.
- The "conditional" function causes a conditional branch on a stream. Conditional branching is based on values of a Measure (e.g., If Value=Top 20% Do A, Else Do B). Branching can be a binary decision or multiple choice decision, similar to a case statement. Normally, conditional branches will join back into a single flow.
- The "de-duplicating" function refers to de-duplication and removes all duplicate records (i.e., rows having the same primary key value) in a merged Segment.
- The "merge" function merges back a previously split workflow into a single stream. Two types of "merge" are supported: (1) "classic merge" which when merging a Segment X with attributes A and B with Segment Y with attributes B and C, will return a Segment Z with attribute B, and (2) "merge with de-dupe" which when merging a Segment X with attributes A and B with Segment Y with attributes B and C, will return Segment Z with attributes A, B, and C. All duplicates of attribute B will be removed. Also, the merge function require that the two Segments being merged come from the same top level Segment.
- The "random N" function returns a random sample of size N of the Segment.
- The "random %" function returns a random sample of size N percentile of the Segment.
- The "split" function causes the workflow to branch out into two or more separate, concurrent flows based on the value of a Measure or Attribute.
- The "top N" function returns the top N number from the Segment.
- The "top %" function returns the top N percentile from the Segment.
- The "link" function links two steps in the workflow together.

In the left hand pane 302, a tree display shows a hierarchy comprised of a Workbench having a subordinate Analysis Manager. The Analysis Manager includes subordinate levels comprised of Templates, Segments, Filters, Measures, and Functions. Each of these subordinate levels includes zero or more copies of the specified components that have been created and are available for reuse. New copies of the specified components can be created using a "New" function from the "File" menu.

The icons from the left hand pane 302 or the tool bar 308 may be "dragged and dropped" onto the right hand pane 304 and then linked together to create the sequence of steps that comprise the workflow of an Application Template 206. The sequence of the icons and the direction of the connecting arrows determine the sequence of execution and data flow.

Users can choose from a set of pre-defined Application Templates 206 from the tree display of the left-hand pane 302 or create ad hoc Application Templates 206, as desired. In either case, the user can create and manipulate the Application Template 206. Further, users can add, modify and delete the steps (icons) within the Application Template 206.

Dynamically Building Predictive Models

In the preferred embodiment, the CRM Client 102 can invoke an analytic algorithm for rule induction via the module 214 of the Object Manager 208 to perform the "Define a Derived Measure" task of the "measure" function, thereby creating a predictive model, instead of the user providing the definition of the Measure (in the form of a formula). The module 214 accesses or invokes the application programming interface (API) to the TeraMiner™ product to invoke the analytic algorithm for rule induction. This analytic algorithm for rule induction is further described in the co-pending and commonly-assigned application Ser. No. 09/410,530, filed on Oct. 1, 1999, by Todd M. Brye, entitled "SQL-Based Analytic Algorithm for Rule Induction," attorney's docket number 8221, which application is incorporated by reference herein.

The analytic algorithm for rule induction provided by the TeraMiner™ product builds a predictive model based on the Segment and related Attributes presented to it, and returns the model as the new Measure. The Measure (i.e., the model) can then be used against other Segments with matching Attribute definitions (using the "Apply Measures to Segment" task of the "segment" function), for test purposes and later for deployment purposes.

Figure 4:
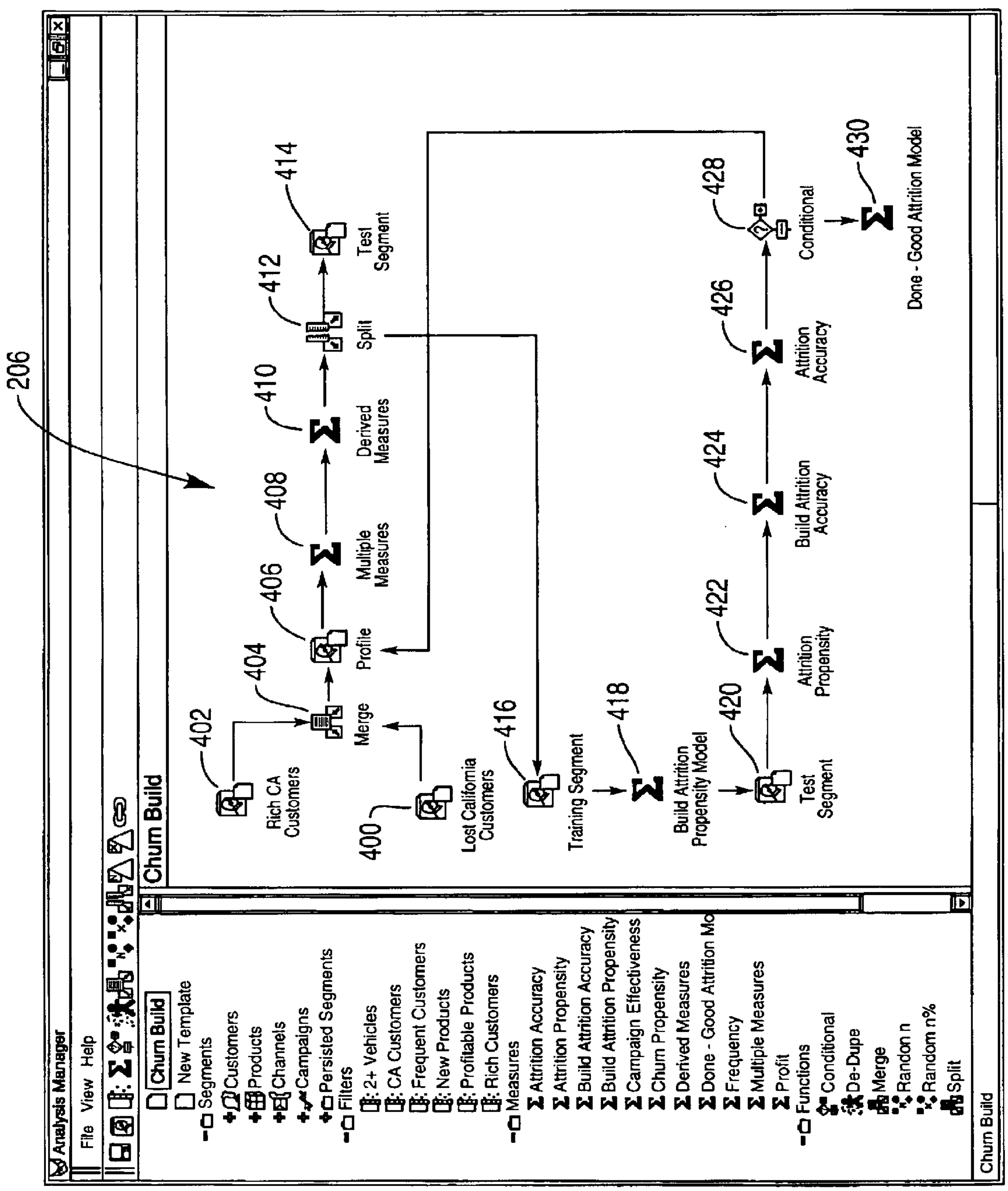
FIG. 4 illustrates an Application Template used to build a predictive model according to the preferred embodiment of the present invention.

The creation of the predictive model is illustrated in the workflow of FIG. 4, described further below, which represents an Application Template 206 that might be used in a customer retention campaign (i.e., for building a predictive model that will identify those customers that have a high likelihood for attrition). This workflow is a simplified subset of a standard data mining process, incorporating both modeling and evaluation phases, and some aspects of a data preparation phase. The initial business understanding and data understanding phases are assumed to have occurred prior to this workflow, and a final deployment phase would occur subsequent to this workflow (by applying the Measure to a Segment).

In order to produce the best results from the workflow illustrated below, it would be necessary for a skilled user to have previously built a predictive model for the class of problem at hand (in this example, Attrition Propensity scoring), and to have recorded the key knowledge gained from this exercise in the form of such a reusable Application Template 206, such that less skilled users can benefit from this knowledge.

The Application Template 206 records such knowledge as:

what type of customers (or ex-customers) to use in building the model, which Attributes and Measures are potential predictors of the target behavior (including any derived variables, recreated in the form of Derived Measures), how to separate the input data into a training set and a test set, and how to evaluate the model (i.e., determine its accuracy and effectiveness).

This knowledge is used as the starting point for the user, who adapts the Application Template 206 to the particular context of the business problem at hand. In addition to changing initial default values (e.g., the model accuracy requirement), this might include selecting a different type of customer segment as the input set, selecting a different set of input variables (Attributes and Measures), building new derived variables (Derived Measures), separating the input set into more than two subsets (e.g., to provide a hold-out validation set), and adding or deleting workflow steps.

Example Application Template

The following describes an example Application Template 206. Assume that a cellular phone company has been losing customers in California, due to increased competition in the state. In preparing for a retention campaign, the user develops an Attrition Propensity model that will predict which customers are most likely to terminate their service with the company. She accomplishes this by adapting a pre-built Application Template 206 that encapsulates the knowledge gained by a prior user in addressing the same class of problem in a similar industry. Thus, the types of customers and the data that is available about them is assumed to be similar.

The approach taken by the Application Template 206 is to create a Segment comprising 50% customers who recently terminated service and 50% loyal customers, and to use this data to build and then test a model to identify the characteristics that differentiate the two types of customers. Prior to separating the input Segment into a training Segment and a test Segment, a set of the appropriate input variables is generated for each record, using a Profile function that retrieves a set of Attribute values and an Apply Measures to Segment task that generates a set of Measures; the user may subset these and optionally derive some new Measures as inputs. The model is built using the training Segment, and its accuracy is tested using the test Segment. If accuracy is below a target threshold (e.g., 85%), the Application Template 206 repeats the variable selection functions to allow the user to make variations to improve the model.

Figure 5:
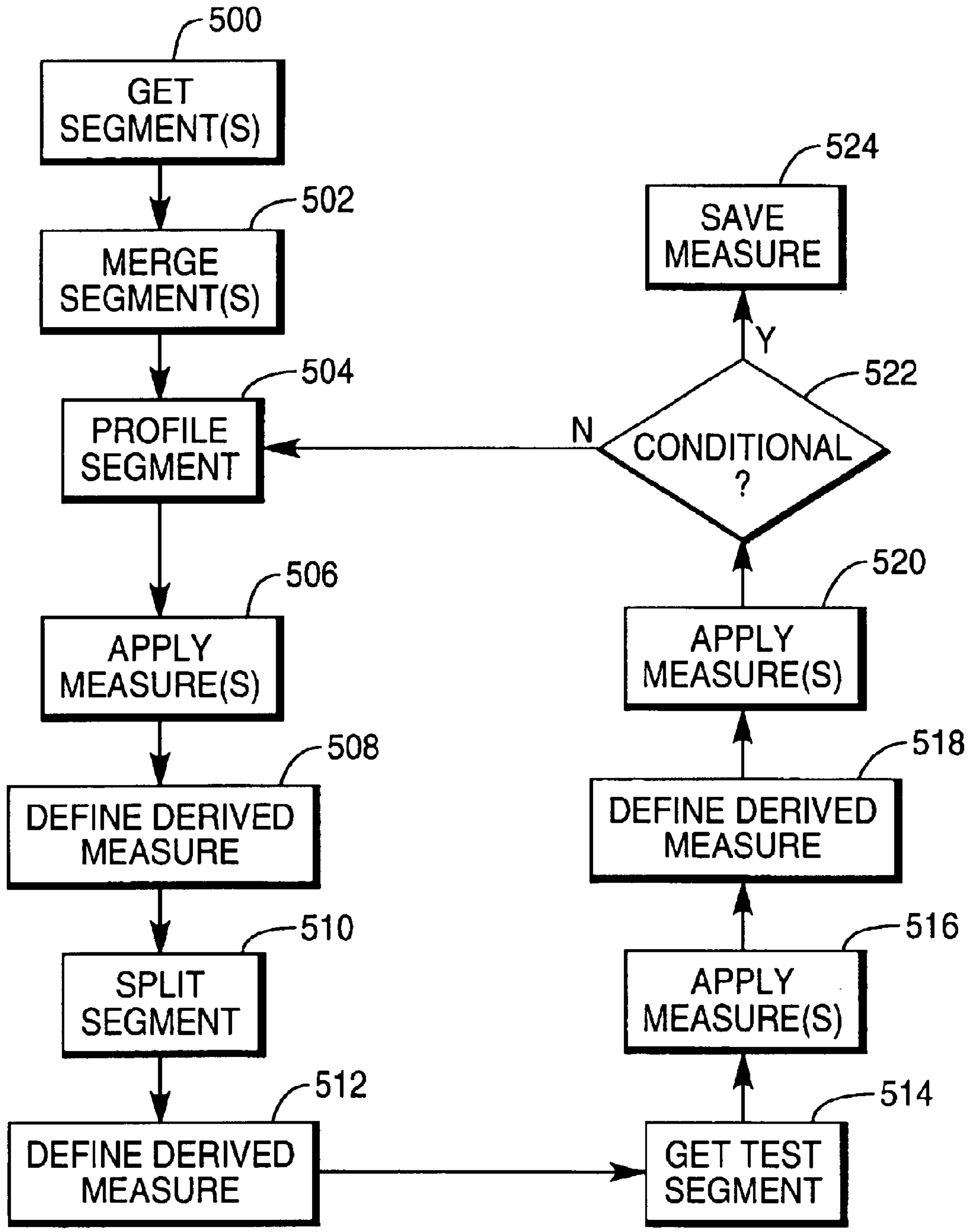
FIG. 5 is a flowchart that illustrates the logic used to build a predictive model according to the preferred embodiment of the present invention.

Referring to FIG. 4, an example Application Template 206 is shown, wherein the Application Template 206 includes a workflow comprising a sequence of steps using icons. The sequence and data moves along the flow of the arrows linking the various icons. The logic of the Application Template 206 is described below in conjunction with FIG. 5:

Icon 400 represents a "Get a Segment" task for a Segment referred to as "Lost California Customers" (Block 500).

Icon 402 represents a "Get a Segment" task for a Segment referred to as "Rich California Customers," using a random sample of N, where n is the size of the "Lost California Customers" Segment (Block 500). The "Rich California Customers" Segment is comprised of customers with a longevity of service above a certain threshold, e.g., 3 years.

Icon 404 represents the merging of the Segments, wherein a "Segment Source" ID is stored with each record, and the ID comprising "1" for "Lost California Customers," and "2" for "Rich California Customers" (Block 502).

Icon 406 represents a "Profile a Segment" task performed against the resulting Segment (Block 504). Before running the task, the Application Template 206 prompts the user to optionally subset the list of Attributes to be returned in the Profile, to be later used as input variables for building the model (the initial default is "all," but this may be modified by the user). Thereafter, the profiling of the merged Segment returns a set of demographic, psychographic, behavioral and preference Attributes.

Icon 408 represents an "Apply Measures to Segment" task performed against the Segment (Block 506). The Application Template 206 first prompts the user to optionally subset or change the set of Measures to be applied against the Segment, and thereafter, the Application Template 206 computes the Measures for the merged Segment (to be later used as input variables for building the model, along with the previously selected Attributes).

Icon 410 represents a "Define a Derived Measure" task performed against the Segment (Block 508). The Application Template 206 prompts the user to define any derived Measures from any of the current set of Measures and Attributes. This provides an opportunity for the user of the Application Template to identify any additional input variables to be used in building the model.

Icon 412 represents the splitting of the Segment (Block 510). The Application Template 206 prompts the user to specify a split value for the Segment, wherein the default is a 50:50 split. The Application Template 206 then creates a random split of the Segment, using the specified value, into a Test Segment 414 and a Training Segment 416, respectively.

Icon 418 represents a "Define a Derived Measure" task being performed against the Training Segment 416 (Block 512). This task constructs a new Measure known as "Attrition Propensity" by building a decision tree model for the Measure. The Application Template 206 builds the decision tree model by invoking a model-building algorithm (e.g., the analytic algorithm for rule induction) via the module 214 of the Object Manager 208 using the Training Segment 416. Specifically, the module 214 accesses or invokes the application programming interface (API) to the TeraMiner™ product and the analytic algorithm for rule induction is described in the co-pending and commonly-assigned application Ser. No. 09/410,530, filed on Oct. 1, 1999, by Todd M. Brye, entitled "SQL-Based Analytic Algorithm for Rule Induction," attorney's docket number 8221, which application is incorporated by reference herein.

The analytic algorithm for rule induction in the TeraMiner™ product uses the RDBMS 106 to retrieve counts and order data within the database 108, and then extracts the information to determine the rules or splits in a rule induction tree. The rule induction tree comprises a predictive model (a formula in SQL) that predicts the likelihood for attrition. The target variable for the algorithm (i.e., the characteristic to be predicted) is identified as "Segment Source," and all other current Segment Attributes and Measures are the input variables. The model that is built will thus use the input variables to predict Segment Source (i.e., whether "Lost California Customer" or "Rich California Customer").

Icon 420 represents a "Get a Segment" task being performed against the Test Segment 414 (Block 514).

Icon 422 represents an "Apply Measures to Segment" task being performed against the Test Segment 414 (Block 516). The Application Template 206 executes the newly built rule induction tree against the Test Segment 414 to compute the Measure "Attrition Propensity" for each record therein ("Attrition Propensity" is the name given to output of the model, which is a probability score of the likelihood of having a Segment Source of "1").

Icon 424 represents a "Define a Derived Measure" task being performed against the Test Segment 414 (Block 518). This task builds a new Measure known as "Attrition Accuracy" by defining the percentage of test cases predicted correctly as a percentage of Test Segment 414, where "Attrition Propensity"(i.e., the predicted likelihood of attrition, in the form of a percentage score), when converted back to a "1" or a "2," equals "Segment Source." Note that conversion occurs by substituting a "1" for "Attrition Propensity" scores above 50%, and a "2" for scores below 50%. Also, recall that "1" ="Lost California Customers," and "2" ="Rich California Customers".

Icon 426 represents an "Apply Measures to Segment" task being performed against the Test Segment 414 (Block 520). The Application Template 206 applies the Measure "Attrition Accuracy" against the Test Segment 414 to analyze the results. This Measure calculates the percentage of test cases that were predicted correctly.

Icon 428 represents a "conditional" function being performed (Block 522). The "conditional" function prompts the user for a percentage value related to the Measure "Attrition Accuracy," wherein the default is 85%. A branch back to icon 406 occurs, if the conditional is false, i.e., the Measure "Attrition Accuracy" is below the specified value; otherwise, the sequence proceeds to icon 430 if the conditional is true, i.e., the Measure "Attrition Accuracy" is above the specified value.

At icon 430, the Measure "Attrition Propensity" (the predictive model) can now be saved (Block 524) and subsequently applied or deployed against any Segment of customers with the same available input variables (Attributes and Measures), to predict the attrition likelihood of each customer in the Segment.

Conclusion

This concludes the description of the preferred embodiment of the invention. The following paragraphs describe some alternative embodiments for accomplishing the same invention.

In one alternative embodiment, any type of computer could be used to implement the present invention. In addition, any database management system, decision support system, on-line analytic processing system, or other computer program that performs similar functions could be used with the present invention.

In summary, the present invention discloses a Customer Relationship Management (CRM) system that dynamically builds predictive models. The system is used by business users who are unfamiliar with the art of data mining. A model-building mechanism in a data mining subsystem is presented with a training segment consisting of records with appropriate input attributes and an output attribute to be predicted; the model-building mechanism builds a model in the form of a business measure that can subsequently be applied to make predictions against other like segments.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for dynamically building predictive models within a computer-implemented business analysis environment, comprising:

(a) generating a definition for a derived measure;

(b) invoking a model-building mechanism in a data mining system based on the generated definition, wherein the model-building mechanism builds a predictive model that generates an output for the derived measure.

2. The method of claim 1, further comprising applying the derived measure against a segment by executing the predictive model, and generating an output for the segment from the predictive model.

3. The method of claim 1, wherein the derived measure is defined within an application template, the application template comprises a sequence of elements linked together in a workflow, and the elements Are selected from a group comprising a segment, a filter, a measure and a function.

4. The method of claim 3, wherein the application template is constructed in a visual programming environment.

5. The method of claim 4, wherein the application templates can be reused for modified by users.

6. The method of claim 3, wherein in the segment is a grouping of data elements from a database organized about one or more attributes.

7. The method of claim 3, wherein the filter defines one or more attribute constraints applied to a segment.

8. The method of claim 3, wherein the profile is a labeled collection of attributes of a segment.

9. The method of claim 3, wherein the measure is an expression applied to a segment.

10. The method of claim 3, wherein the computer-implemented business analysis environment includes an object model, ad the segments, attributes, filters, and measures comprise objects.

11. The method of claim 10, wherein operations upon the objects are translated into SQL statements that access corresponding tables and columns in a relational database.

12. The method of claim 1, wherein the predictive model comprises one or more SQL statements that access tables and columns in a relational database.

13. The method of claim 1, wherein the predictive model comprises one or more statements executed by a database management system.

14. The method of claim 13, wherein the statements access data stored in the database management system.

15. The method of claim 1, wherein the model-building mechanism comprises an analytic algorithm for rule induction performed against data stored in a database segment system to create the predictive model.

16. A computer-implemented system for dynamically building predictive models, comprising:

(a) logic, performed by a computer; for generating a definition for a derived measure; and (b) logic, performed by a computer; for invoking a model-building mechanism in a dart mining system based on the generated definition, wherein the model-building mechanism builds a predictive model that generates an output for the derived measure.

17. The system of claim 16, further comprising logic for applying the derived measure against a segment by executing the predictive model, and generating an output for the segment from the predictive model.

18. The system of claim 16, wherein the derived measure is defined within an application template, the application template comprises a sequence of elements linked together in a workflow, and the elements are selected from a group comprising a segment, a filter, a measure and a function.

19. The system of claim 18, wherein the application template is constructed in a visual programming environment.

20. The system of claim 19, wherein the application templates can be reused or modified by users.

21. The system of claim 18, wherein the segment is a grouping of data elements from a database organized about one or more attributes.

22. The system of claim 18, wherein the filter defines one or more attribute constraints applied to a segment.

23. The system of claim 18, wherein has profile is a labeled collection of attributes of a segment.

24. The system of claim 18, wherein the measure is an expression applied to a segment.

25. The system of claim 18, wherein the computer-implemented business analysis environment includes an object model, and the segments, attributes, filters, and measures comprise objects.

26. The system of claim 25, wherein operations upon the objects are translated into SQL statements that access corresponding tables and columns in a relational database.

27. The system of claim 16, wherein the predictive model comprises one or more SQL statements that access tables and columns in a relational database.

28. The system of claim 16, wherein the predictive model comprises one or more statements executed by a database management system.

29. The system of claim 28, wherein the statements access data stored in the database management system.

30. The system of claim 16, wherein the model-building mechanist comprises an analytic algorithm for role induction performed against data stored in a database management system to create the predictive model.

31. An article of manufacture embodying logic for dynamically building predictive models within a computer-implemented business analysis environment, the logic comprising:

(a) generating a definition for a derived measure;

(b) invoking a model-building mechanism in a data mining system based on the generated definition, wherein the model-building mechanism builds a predictive model that generates an output for the derived measure.

32. The article of manufacture of claim 31, further comprising applying the derived measure against a segment by executing the predictive model, and generating an output for the segment from the predictive model.

33. The article of manufacture of claim 31, wherein the derived measure is defined within an application template, the application template comprises a sequence of elements linked together in a workflow, and the elements are selected from a group comprising a segment, a filter, a measure and a function.

34. The article of manufacture of claim 33, wherein the application template is constructed in a visual programming environment.

35. The article of manufacture of claim 34, wherein the application templates can be reused or modified by users.

36. The article of manufacture of claim 33, wherein the segment is a grouping of data elements from a database organized about one or more attributes.

37. The article of manufacture of claim 33, wherein the filter defines one or more attribute constraints applied to a segment.

38. The article of manufacture of claim 33, wherein the profile is a labeled collection of attributes of a segment.

39. The article of manufacture of claim 33, wherein the measure is an expression applied to a segment.

40. The article of manufacture of claim 33, wherein the computer-implemented business analysis environment includes an object model and the segments, attributes, filters, and measures comprise objects.

41. The article of manufacture of claim 40, wherein operations upon the objects are translated into SQL statements that access corresponding tables and columns in a relational database.

42. The article of manufacture of claim 31, wherein the predictive model comprises one or more SQL statements that access tables and columns in a relational database.

43. The article of manufacture of claim 31, wherein the predictive model comprises one or more statements executed by a database management system.

44. The article of manufacture of claim 43, wherein the statements access data stored in the database management system.

45. The article of manufacture of claim 31, wherein the model-building mechanism comprises an analytic algorithm for rule induction performed against data stored in a database management system to create the predictive model.

* * * * *

UNITED STATES PATENT AND TRADEMARK OFFICE

CERTIFICATE OF CORRECTION

PATENT NO. : 6,954,758 B1

DATED : October 11, 2005

INVENTOR(S) : O'Flaherty, K.

It is certified that error appears in the above-identified patent and that said Letters Patent is hereby corrected as shown below:

Column 11,

Line 6, after "reused" delete "for" and insert -- or --.
Line 7, after "wherein" delete "in".
Line 18, after "," first occurrence, delete "ad" and insert -- and --.
Line 33, after "database" delete "segment" and insert -- management --.
Line 40, after "a", delete "dart" and insert -- data --.
Line 63, after "wherein" delete "has" and insert -- the --.

Column 12,

Line 10, delete "mechanist" and insert -- mechanism --.

Signed and Sealed this

Twenty-fifth Day of April, 2006

JON W. DUDAS

*Director of the United States Patent and Trademark Office*